(Model.)

L. J. PHELPS.
ANIMAL TRAP.

No. 275,786. Patented Apr. 10, 1883.

WITNESSES
Bernhard Essroger
Frederick F. Goodwin

INVENTOR
Lucius J. Phelps
By Charles Bromwell
Attorney.

UNITED STATES PATENT OFFICE.

LUCIUS J. PHELPS, OF CHICAGO, ILLINOIS.

ANIMAL-TRAP.

SPECIFICATION forming part of Letters Patent No. 275,786, dated April 10, 1883.

Application filed April 9, 1880. Renewed October 6, 1882. (Model.)

*To all whom it may concern:*

Be it known that I, LUCIUS J. PHELPS, of the city of Chicago, county of Cook, and State of Illinois, have invented a new and useful Improvement in Animal-Traps, of which the following is a specification.

My invention relates to a trap for catching and securing animals by setting the trap and placing it in front of the holes or in the runways where such animals are.

The invention consists in forming pieces of wire of sufficient strength and weight, so as to arrange a coil-spring connected with a circle-frame. On the top is formed a loop-opening. Then it is brought around the stem near the coil-spring and secured in such a way that a projecting end is formed, around which is fastened a piece of wire in such a way that it will move freely around the projecting end. From the other end of the coiled spring extends a straight piece of wire to the extreme side of the circular frame, and the end is folded back to a point, *b*, forming a loop around the circular frame in such a way as to work up and down freely. The end is passed over and around the wire, securing it and leaving a sharp projecting point. At this junction a piece of wire of sufficient length to extend upward and across the circular frame and through the loop on top of the frame is fastened in such a way as to move freely when pressed or relieved.

The accompanying drawings represent a trap made in accordance with my invention.

I am aware of Letters Patent issued to W. C. Hooker, August 12, 1879, No. 218,532; but I do not describe or claim anything in said patent, and I hereby disclaim all devices and combinations therein shown.

Figure 1:
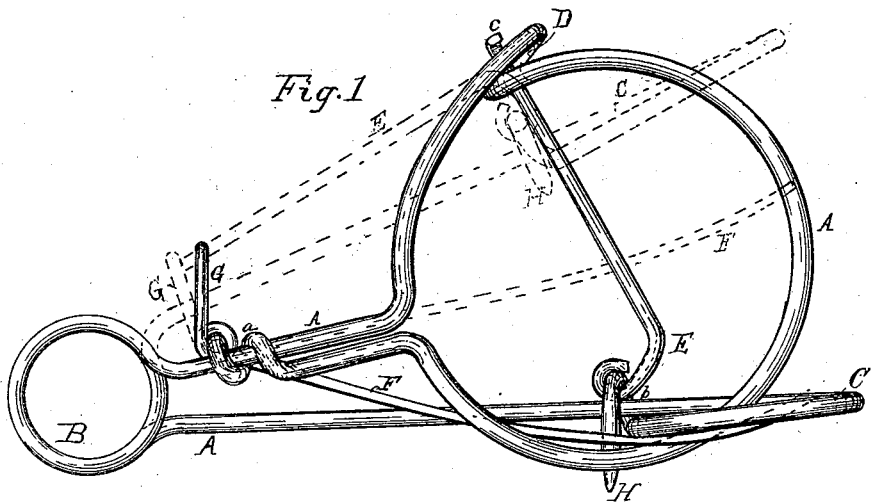
Figure 2:
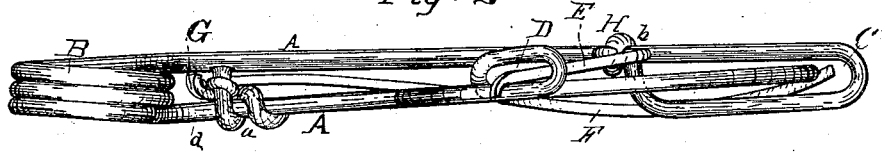

Figure 1 is a side view. Fig. 2 is a top view.

Like letters of reference indicate like parts.

My trap is made of three pieces of wire, A, E, and F. A shows a piece of wire coiled closely near the center in a circular form, so as to form the spring B, leaving two projecting ends, one of which is extended out to a point straight from the coil of the spring B, forming a shank of about three inches in length, when it is extended in a circular form to a point near the top or apex of the circle, where it is folded back and formed into an open loop, D. Then it is extended in a circular way around to the junction of the shank, and passed over and around the shank *a*, leaving a horizontal and projecting end. At the point *a* is connected the wire trigger F with an upright projection. The opposite end of the trigger F is formed of sufficient length to extend across the extreme opposite side of the circular frame A, and is slightly curved in the center, and is allowed to move freely up and down in the circular frame. The other end of the wire A extends continuously from the spring B straight across the circular frame, and is folded back, forming the open sliding loop C around the frame, and of sufficient length and size to allow it to pass around the extreme outside of the circular frame, and is fastened about the center of the straight wire, and a sharp projecting point, H, is formed and held by passing the wire over and around the straight bar of the shaft. At the connecting-point *b* is the lever E, linked around a shoulder of the loop C, then extending upward and across the circular frame and passing through the loop D, and on the end of it is formed the hook *c*.

To set the trap the spring B is held in the left hand. With the right hand, raise the sliding loop C to the dotted lines C. The lever E rises and extends through the loop D, and is drawn over and down to the dotted lines G, where it interlocks with the projecting end of the trigger F, holding the extreme end of the trigger across the frame, as shown by dotted lines F. The straight projecting point H is held perpendicularly and over the trigger F, as shown by the dotted lines H. The trap is then placed over the hole or in the runways of the animal, and as the same comes in contact with the trigger F from either side, over or under the same, it disengages at the connection made by the trigger F and the lever E at the point G, and by the force of the spring B the sliding loop C is forced violently down to the lower curve of the circular frame, carrying with it the projecting point H onto the animal, and thus securing it.

Having thus described my invention, what I claim as new, and desire to secure by Letters Patent, is—

In an animal-trap, the frame A, forming the sliding loop C, spring B, and loop D, in combination with the lever E and trigger F, substantially as and for the purpose described.

LUCIUS J. PHELPS.

Witnesses:
C. BROWNELL,
FREDERICK C. GOODWIN.